Nov. 22, 1949     R. T. ZWACK     2,489,212

FLUID SEAL

Filed Feb. 27, 1946

INVENTOR
R. T. ZWACK
BY E. S. Smith
AGENT

Patented Nov. 22, 1949

2,489,212

UNITED STATES PATENT OFFICE 2,489,212

FLUID SEAL

Raymond T. Zwack, West Caldwell, N. J., assignor to Bendix Aviation Corporation, Teterboro, N. J., a corporation of Delaware Application February 27, 1946, Serial No. 650,503

2 Claims. (Cl. 286—11)

The invention relates broadly to fluid seals for shafts which are movable in the wall of a chamber or housing containing fluid which may be at a pressure different from that outside.

The invention especially relates to seals of the type including a flexible diaphragm for pumps for aircraft engines, e. g., and has particular reference to a means for detachably drivably connecting the pump to the engine and sealing against leakage around the pump shaft with provisions to eliminate binding and leakage due to misalignment of the driving and pump shafts, and especially to enable one to readily replace the sealing diaphragm.

The use of diaphragm seals is known in connection wtih such drives and presents the problem of finding a readily accessible arrangement in which the diaphragm is sufficiently flexible to permit the seal to be maintained between the rotating thrust parts at high speed with the inevitable torsional drag due to friction.

One of the objects of the invention is to provide a means for relieving the diaphragm from the torsional stress due to friction and still, especially in the small sizes used for such pumps, permitting the ready replacement of the diaphragm in the field without special tools or fixtures.

A further object is to provide an improved diaphragm-type sealing means of small inertia and relatively strong force biasing the bearing surfaces into contact at high speeds in spite of the slight misalignments that inevitably occur in practice.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

Figure 1:
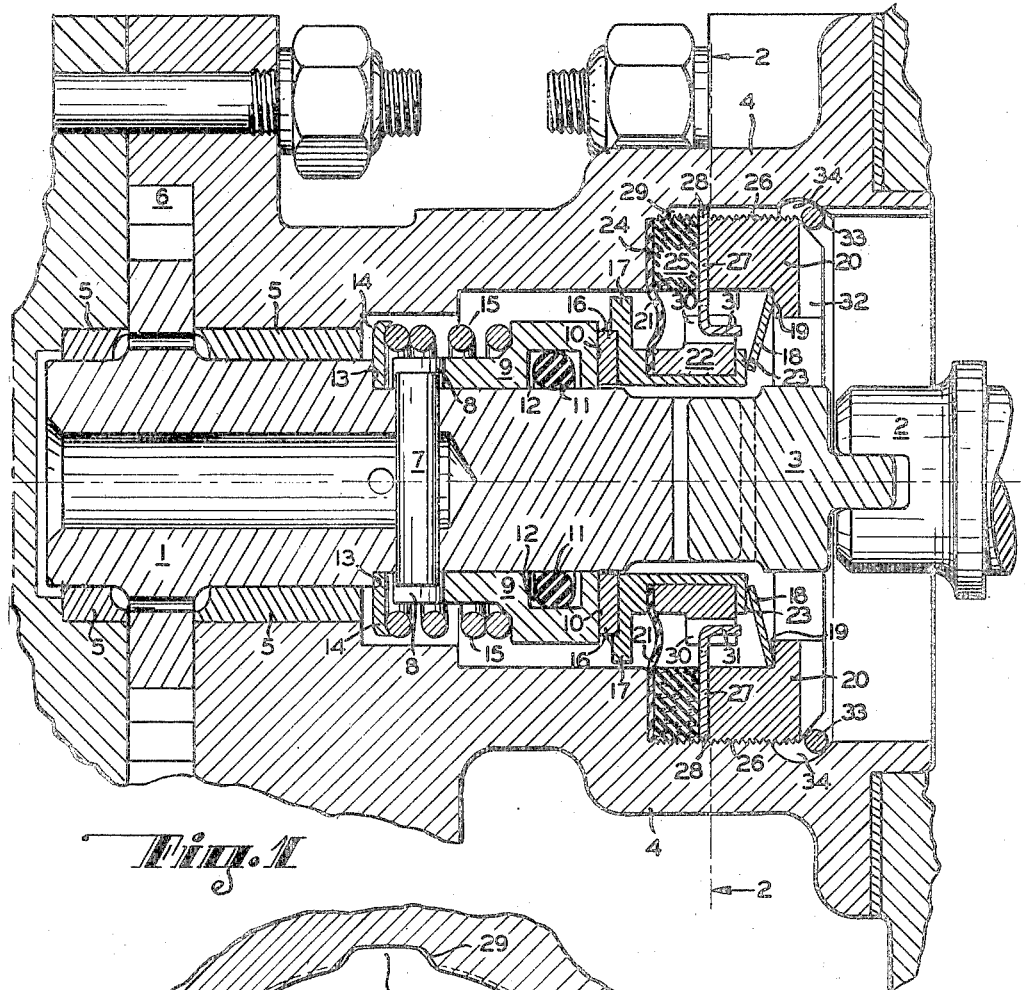
Fig. 1 is a section along the axis of the pump and engine shafts.
Figure 2:
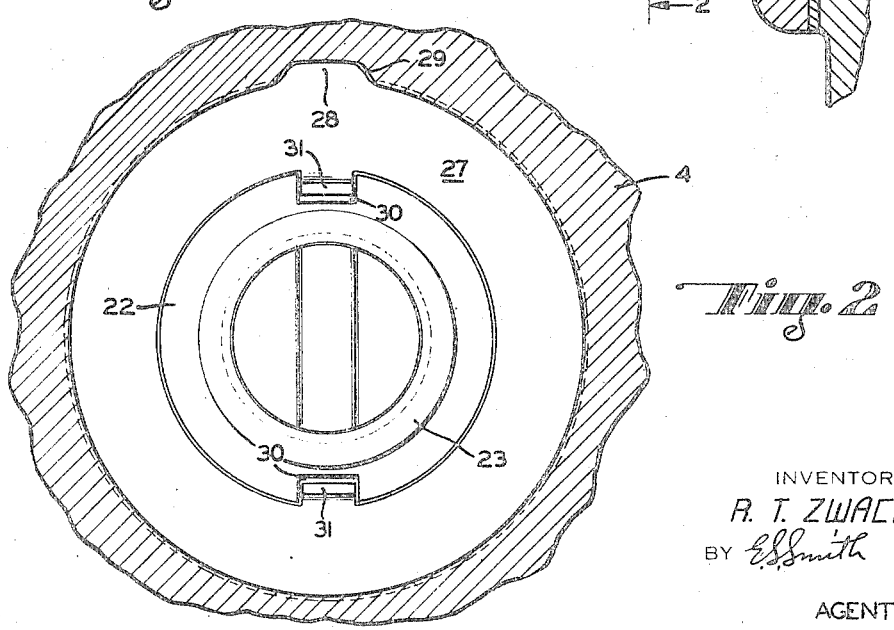
Fig. 2 is an end view, partially in the plane 2—2 of Fig. 1, the section being taken only as to the housing and with the clamping nut and its washer and locking ring removed to permit a better view of the diaphragm assembly and the means for preventing rotation thereof.

In the figures wherein like characters represent like elements throughout, the pump shaft 1 is driven by the engine shaft 2 through the universal 3 which drives the pump shaft without stress due to misalignment of the pump and engine shafts. The pump shaft 1 is mounted in the pump housing 4, being journalled by bearings 5, containing the pumped fluid in chamber 6, which fluid may be under either pressure or suction.

Pin 7 extends diametrically through the pump shaft 1, its ends projecting into slots 8 of the hub of the thrust flange 9 which is closely fitted to the shaft 1 and has a highly lapped plane thrust surface 10 normal to the axis of the pump shaft 1. A synthetic seal ring 11, inserted in a groove 12 in the flange 9, prevents leakage between the pump shaft 1 and flange 9 which turn together.

A shoulder 13 on the pump shaft 1 carries the thrust washer 14 for the helical spring 15 which biases flange 9 outwardly, i. e. to the right in Fig. 1 (all right and left directions being taken herein as in this figure) against the lead-bronze bearing 16 which is soldered to the lefthand end of the brass spool member 17 whose righthand end is biased by the disc spring washer 18 to the left, the outer edge of spring washer 18 abutting a shoulder 19 of the clamping ring 20. This arrangement keeps the bearing surface 10 of the flange 9 and that of the mating bearing surface of the lead-bronze washer 16 in running contact. The chamber 6 contains means, e. g., a gear on pump shaft 1 which gear is fitted with working end clearances within the housing 4, for opposing the thrust of the spring washer 18.

Spool member 17 has attached a nylon-impregnated synthetic rubber diaphragm 21 which is clamped by the generally annular brass ring 22 against the lefthand end of the spool 17 whose righthand end 23, against which washer 18 presses, has been spun over to provide the stated clamping. Diaphragm 21 is sufficiently flexible to enable the bearing washer 16 to follow the bearing surface 10 of rotating flange 9 at speeds of the order of 10,000 R. P. M. even though the flange be not in perfect alignment.

The outer portion of diaphragm 21 is clamped against the housing's shoulder 24 by the highly compressible cork-compound ring sealing washer 25, which fits within the threads 26 of the housing 4, when the clamping ring 20 is screwed into place. Located between the outer surface of the compressible ring washer 25 and the inner surface of the clamping ring 20 is the brass ring plate 27 which is provided with an outer tab 28 which fits within a slot 29 which extends radially beyond the threads 26 into the housing 4, the slot 29 being parallel with the axis of the pump shaft. This tab 28 and slot 29 prevent the rotation of the ring plate 27 due to the torsional drag of the bearing between flange 9 and its bearing 16, this torque being carried through the spool 17 and the brass ring 22 to slots 30 into which fit two bent tabs 31 which are portions of the ring plate 27.

It is apparent that complete sealing occurs since: (a) the synthetic ring 11 prevents leakage between the pump shaft 1 and the flange 9, (b) the highly lapped thrust surface 10 of flange 9 turns smoothly against its mating bearing plate 16 to prevent appreciable leakage there since these surfaces are forced tightly together by the spring washer 18 and the spring 15 since the shaft is held against axially-inward movement by the pump gear, and (c) the diaphragm 21 prevents leakage between the member 17 and the housing 4.

In former known attempts to solve the problem of taking the torsional load off such a flexible diaphragm 21, the torsionally restraining means for the spool 17 was located on the pump side of the diaphragm 21. While this sealed bearing could be assembled at the factory with the aid of suitable locating fixtures, difficulty developed in the field when replacements were attempted. In the field, the operator normally did not have available the fixtures for locating the torque-restraining means and was usually unable to locate them by feel while attempting to insert the sealed bearings against the considerable force of the helical spring 15.

To meet this situation by the present invention, the torque-restraining tabs 28 and 31 of the ring plate 27 are located on the axially-outside end of the diaphragm 21 so that the slots 30 are visible during diaphragm replacements and can hence be lined up by turning the diaphragm assembly so that the slots 30 visibly come into the same plane with the slot 29, after which the ring plate 27 is dropped into place with its tabs 28 and 31 respectively engaging slot 29 in the pump housing 4 and slots 30 in the ring 22.

Clamping ring 20 is provided at its axially-outer end with the diametrical slots 32 for engagement with a spanner (not shown) which is manually turned to screw the clamping ring tightly into place.

After the clamping ring 20 has been thus screwed into place, the steel snap ring 33 is forced into a circumferential groove 34 located at the axially-outer end of the female threaded portion of the housing 4, the steel snap ring 33 being constructed to tend to expand when in this position to hence retain the clamping ring 20 in position against accidental loosening.

The certainty of locking is commonly increased by slightly backing off the clamping ring 20 after the snap ring 33 is in place, the resiliency of the cork-compound washer 25 ensuring the fluid-tightness of the seal between the housing's shoulder 24 and the diaphragm 21.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In combination, a housing adapted to contain a fluid, a shaft which is rotatable in the housing, a flange closely fitting the shaft and having both a groove next to the shaft and a smooth hard bearing-surface of revolution about the shaft's axis, a sealing ring in the groove and tightly bearing against both the shaft and the flange to prevent leakage therebetween, means for causing the flange to turn with the shaft while permitting limited movement of the flange along the shaft, resilient means biasing the flange outwardly along the shaft, an annular member having a smooth relatively soft bearing surface mating with the hard bearing surface of the flange, a flexible annular diaphragm tightly clamped against a portion of the member at the smaller-diameter portion of the diaphragm, means for tightly clamping the larger-diameter portion of the diaphragm against the housing, the last-named means including both an outer externally threaded clamping ring and an intermediate washer which bears against the larger-diameter portion of the diaphragm, the housing being internally threaded to mate with said clamping ring with the threads parallel with the shaft; slots, parallel with the shaft, in the internally threaded portion of the housing and in a peripheral portion of the member, which portion is outside of the diaphragm; a ring plate having tab portions loosely fitting the slots to substantially prevent twisting of the member relative to the housing and hence to relieve the diaphragm of the torque due to friction between the bearing surfaces of the flange and of the member when the shaft rotates, a spring abutting the outer end of the member and a portion of said clamping ring to thrustingly bias the relatively rotating mating portions of the flange and member into bearing relation to prevent leakage therebetween, and means accessible from the outer end of the fluid seal for screwing said clamping ring into position to cause tight clamping of the larger-diameter portion of the diaphragm.

2. In combination, a housing adapted to contain a fluid, a shaft which is rotatable in the housing, means connected with the shaft to turn therewith and having a smooth bearing-surface of revolution about the shaft's axis; an annular member having a relatively soft bearing surface mating with the first-named bearing-surface, the bearing surfaces being of different hardnesses, an annular flexible diaphragm having its smaller-diameter portion tightly clamped by a portion of the member, means for tightly clamping the larger-diameter portion of the diaphragm against the housing, the last-named means including both an outer clamping ring and an intermediate highly compressible washer bearing against the larger-diameter portion of the diaphragm, the housing being constructed to have a generally cylindrical hole fitting said clamping ring's periphery to permit axial movement of the clamping ring relative thereto; slots, parallel with the shaft, in said cylindrical hole portion of the housing and in a peripheral portion of the member, which portion is outside of the diaphragm; a ring plate having tab portions loosely fitting the slots to substantially prevent twisting of the member relative to the housing and hence to relieve the diaphragm of the torque due to friction between the bearing surfaces of the flange and of the member when the shaft rotates, a spring abutting the outer end of the member and a portion of said clamping ring to thrustingly bias the relatively rotating mating portions of the flange and member into bearing relation to prevent leakage therebetween, means having a portion accessible from the outer end of the fluid seal for detachably securing said clamping ring in normal operating position to coact with the compressible washer to cause tight clamping of the larger-diameter portion of the diaphragm to normally prevent leakage around the outside of the diaphragm, and means for preventing the accidental loosening of said clamping ring when the latter is in said normal operating position.

RAYMOND T. ZWACK.

REFERENCES CITED

The following references are of record in the file of this patent:

UNITED STATES PATENTS

| Number | Name | Date |
| --- | --- | --- |
| 2,294,387 | Curtis et al. | Sept. 1, 1942 |
| 2,297,302 | Hornschuch | Sept. 29, 1942 |
| 2,362,854 | Stephens | Nov. 14, 1944 |
| 2,382,245 | McCormack | Aug. 14, 1945 |
| 2,389,528 | McConaghy | Nov. 20, 1945 |
| 2,395,359 | Vedovell | Feb. 19, 1946 |
| 2,401,379 | Smith | June 4, 1946 |

FOREIGN PATENTS

| Number | Country | Date |
| --- | --- | --- |
| 548,051 | Great Britain | 1942 |
| 256,542 | Great Britain | 1926 |
| 449,584 | France | 1913 |